(12) United States Patent
Coldicott et al.

(10) Patent No.: US 8,775,462 B2
(45) Date of Patent: *Jul. 8, 2014

(54) SERVICE ORIENTED ARCHITECTURE INDUSTRY MODEL REPOSITORY META-MODEL COMPONENT WITH A STANDARD BASED INDEX

(75) Inventors: Peter Alan Coldicott, Jonestown, TX (US); Eoin Lane, Littleton, MA (US); Magda Mahmoud Mourad, Yorktown Heights, NY (US); Harry Thomas Pendergrass, Aloha, OR (US); Mei Yang Selvage, Pocatello, ID (US); Franciscus Jacobus van Ham, Veldhoven (NL)

(73) Assignee: International Business Machines Corporation, Armonk, NY (US)

( * ) Notice: Subject to any disclaimer, the term of this patent is extended or adjusted under 35 U.S.C. 154(b) by 728 days.

This patent is subject to a terminal disclaimer.

(21) Appl. No.: 12/640,624

(22) Filed: Dec. 17, 2009

(65) Prior Publication Data
US 2011/0153636 A1    Jun. 23, 2011

(51) Int. Cl.
*G06F 17/30*    (2006.01)
(52) U.S. Cl.
USPC .......................................................... 707/769
(58) Field of Classification Search
USPC .................. 707/769, 792, 802; 717/120, 105; 706/47; 705/7.37
See application file for complete search history.

(56) References Cited

U.S. PATENT DOCUMENTS

| 6,256,773 | B1 | 7/2001 | Bowman-Amuah |
| 6,539,396 | B1 * | 3/2003 | Bowman-Amuah .......... 707/769 |
| 6,658,644 | B1 | 12/2003 | Bishop et al. |
| 6,799,174 | B2 | 9/2004 | Chipman et al. |
| 7,080,064 | B2 | 7/2006 | Sundaresan |
| 7,099,859 | B2 | 8/2006 | Sundaresan |
| 7,103,871 | B1 | 9/2006 | Kirkpatrick et al. |
| 7,225,241 | B2 | 5/2007 | Yada |
| 7,318,055 | B2 | 1/2008 | Britton et al. |

(Continued)

FOREIGN PATENT DOCUMENTS

WO    2007113164    10/2007

OTHER PUBLICATIONS

Dinesh et al., Oracle® Enterprise Repository, User Guide, 10g Release 3 (10.3), Jul. 2009, Oracle Corporation, pp. 1-89.*

(Continued)

*Primary Examiner* — Sheree Brown
(74) *Attorney, Agent, or Firm* — Patents on Demand P.A.; Brian K. Buchheit; Scott M. Garrett

(57) ABSTRACT

A method of searching a service oriented architecture industry model repository comprising a meta model service associated with a physical asset repository, the meta model service comprising: at least one topic map meta model with data specific to a particular topic or industry vertical included within an information model repository common meta-meta model, the information model repository common meta-meta model included within a meta-meta-meta model with a topic map based index. The method comprises: a computer receiving entry of a search term for the service oriented architecture industry model repository; the computer searching the service oriented architecture industry model repository for the search term; and displaying results of the searching of the service oriented architecture industry model repository as a topic map comprising data representing meta model service through a graphical interface.

15 Claims, 12 Drawing Sheets

(56) References Cited

U.S. PATENT DOCUMENTS

| | | | |
|---|---|---|---|
| 7,366,706 B2 | 4/2008 | Chang et al. | |
| 7,412,457 B2 | 8/2008 | Saracco et al. | |
| 7,483,973 B2 | 1/2009 | An et al. | |
| 7,526,501 B2 | 4/2009 | Albahari et al. | |
| 7,546,295 B2 | 6/2009 | Brave et al. | |
| 1,260,565 A1 | 10/2009 | Coldicott et al. | |
| 7,890,517 B2 | 2/2011 | Angelo et al. | |
| 7,979,840 B2 | 7/2011 | Zhang et al. | |
| 8,244,768 B2* | 8/2012 | Lane et al. | 707/792 |
| 8,341,155 B2* | 12/2012 | Lane | 707/736 |
| 2002/0059566 A1* | 5/2002 | Delcambre et al. | 717/146 |
| 2002/0069102 A1 | 6/2002 | Vellante et al. | |
| 2002/0073106 A1 | 6/2002 | Parker et al. | |
| 2002/0194053 A1 | 12/2002 | Barrett et al. | |
| 2003/0009740 A1 | 1/2003 | Lan | |
| 2003/0233631 A1 | 12/2003 | Curry et al. | |
| 2004/0172612 A1 | 9/2004 | Kasravi et al. | |
| 2004/0193476 A1 | 9/2004 | Aerdts | |
| 2005/0050311 A1 | 3/2005 | Joseph et al. | |
| 2005/0050549 A1 | 3/2005 | Joseph et al. | |
| 2005/0138113 A1 | 6/2005 | Brendle et al. | |
| 2005/0166178 A1 | 7/2005 | Masticola et al. | |
| 2005/0278202 A1 | 12/2005 | Broomhall et al. | |
| 2006/0015489 A1 | 1/2006 | Probst et al. | |
| 2006/0047810 A1 | 3/2006 | Herzog et al. | |
| 2006/0070083 A1 | 3/2006 | Brunswig et al. | |
| 2006/0106824 A1* | 5/2006 | Stuhec | 707/100 |
| 2006/0174222 A1 | 8/2006 | Thonse et al. | |
| 2006/0229896 A1 | 10/2006 | Rosen et al. | |
| 2006/0236307 A1 | 10/2006 | Debruin et al. | |
| 2006/0241931 A1 | 10/2006 | Abu el Ata et al. | |
| 2007/0073663 A1 | 3/2007 | McVeigh et al. | |
| 2007/0112712 A1 | 5/2007 | Flinn et al. | |
| 2007/0112803 A1* | 5/2007 | Pettovello | 707/100 |
| 2007/0239768 A1 | 10/2007 | Quinn-Jacobs | |
| 2007/0261027 A1 | 11/2007 | Dhanakshirur et al. | |
| 2007/0271277 A1 | 11/2007 | Ivan et al. | |
| 2008/0059630 A1 | 3/2008 | Sattler et al. | |
| 2008/0114700 A1 | 5/2008 | Moore et al. | |
| 2008/0126397 A1* | 5/2008 | Alexander et al. | 707/102 |
| 2008/0127047 A1 | 5/2008 | Zhang et al. | |
| 2008/0133558 A1 | 6/2008 | Carlson et al. | |
| 2008/0134137 A1 | 6/2008 | Petersen | |
| 2008/0178147 A1 | 7/2008 | Meliksetian et al. | |
| 2008/0215358 A1 | 9/2008 | Goldszmidt et al. | |
| 2008/0215400 A1 | 9/2008 | Ban et al. | |
| 2008/0229195 A1 | 9/2008 | Brauel et al. | |
| 2008/0270372 A1 | 10/2008 | Hsu et al. | |
| 2008/0288944 A1 | 11/2008 | Coqueret et al. | |
| 2009/0064087 A1 | 3/2009 | Isom | |
| 2009/0077043 A1 | 3/2009 | Chang et al. | |
| 2009/0089078 A1 | 4/2009 | Bursey | |
| 2009/0109225 A1 | 4/2009 | Srivastava et al. | |
| 2009/0112908 A1 | 4/2009 | Wintel et al. | |
| 2009/0132211 A1 | 5/2009 | Lane et al. | |
| 2009/0138293 A1 | 5/2009 | Lane et al. | |
| 2009/0158237 A1 | 6/2009 | Zhang et al. | |
| 2009/0182610 A1 | 7/2009 | Palanisamy et al. | |
| 2009/0182750 A1 | 7/2009 | Keyes et al. | |
| 2009/0193057 A1 | 7/2009 | Maes | |
| 2009/0193432 A1 | 7/2009 | McKegney et al. | |
| 2009/0201917 A1 | 8/2009 | Maes et al. | |
| 2009/0204467 A1 | 8/2009 | Rubio et al. | |
| 2009/0210390 A1* | 8/2009 | Lane | 707/3 |
| 2010/0082387 A1 | 4/2010 | Cao et al. | |
| 2010/0106656 A1 | 4/2010 | Sheth et al. | |
| 2010/0161629 A1* | 6/2010 | Palanisamy et al. | 707/756 |
| 2011/0035391 A1* | 2/2011 | Werner et al. | 707/756 |
| 2011/0099050 A1* | 4/2011 | Coldicott et al. | 705/7.37 |
| 2011/0099139 A1* | 4/2011 | Coldicott et al. | 706/47 |
| 2011/0099532 A1* | 4/2011 | Coldicott et al. | 717/105 |
| 2011/0099536 A1* | 4/2011 | Coldicott et al. | 717/120 |
| 2011/0153292 A1* | 6/2011 | Lane et al. | 703/6 |
| 2011/0153293 A1* | 6/2011 | Coldicott et al. | 703/6 |
| 2011/0153608 A1* | 6/2011 | Lane et al. | 707/738 |
| 2011/0153610 A1* | 6/2011 | Carrato et al. | 707/738 |
| 2011/0153767 A1* | 6/2011 | Coldicott et al. | 709/207 |
| 2011/0238610 A1 | 9/2011 | Lee et al. | |

OTHER PUBLICATIONS

Oracle® Enterprise Repository Harvester User Guide, 10g Release 3 (10.3), Jul. 2009, Oracle Corporation, pp. 1-1 to 3-14.*

Topic Maps and TEI—Using Topic Maps as a Tool for Presenting TEI Documents, Conal Tuohy et al., Oct. 18, 2007, pp. 1-13.*

Chen, D-W. et al.; " A P2P based Web service discovery mechanism with bounding deployment and publication"; Chinese Journal of Computers; vol. 28; No. 4; pp. 615-626; Apr. 2005.

Lee, J. et al.; "Semantic and Dynamic Web Service of SOA bsed Smart Robots using Web 2.0 Open API", 2008; Sixth International Conference on Software Engineering, Research, Management, and Application; pp. 255-260.

Demirkan, H. et al.; "Service-oriented technology and management: Perspectives on research and practice for the coming decade"; Electronic Commerce Research and Applications vol. 7 Issue 4; Jan. 2008; pp. 356-376.

Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.

Simoes, B. et al.; "Enterprise-level Architecture for Interactive Web-based 3D Visualization of Geo-referenced Repositories"; Association for Computing Machinery Inc. 978-1-60558-432-4/09/0006; Jun. 2009; pp. 147-154.

Kanakalata et al; Performance Opitimization of SOA based AJAX Application; 2009; pp. 89-93.

Annett et al.; "Building Highly-Interactive, Data-Intensive, REST Applications: The Invenio Experience"; 2008; pp. 1-15.

Arnold et al.; "Automatic Realization of SOA Deployment Patterns in Distributed Environments"; ICSOC 2008; LNCS 5364; 2008; pp. 162-179.

U.S. Appl. No. 12/605,660, filed Oct. 26, 2009, Coldicott et al.

Justin Kelleher, "A Resusable Traceability Framework Using Patterns", University of Cape Town, ACM Digital Library, 2005, pp. 50-55.

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

U.S. Appl. No. 12/605,562, filed Oct. 26, 2009, Coldicott et al.

"System and Method for Distributed Web Service Adaptation using Aspect oriented Programming", IBM Technical Disclosure Bulletin, Sep. 15, 2008, pp. 1-3.

Baum et al., "Mapping Requirements to Reusable Components using Design Spaces", 2000, Proceedings 4th International Conference on Requirements Engineering, pp. 159-167.

Hsiung et al., "VERTAF: An Application Framework for the Design and Verification of Embedded Real-Time Software", IEEE Transactions on Software Engineering, vol. 30, No. 10, Oct. 2004, pp. 656-674.

Robinson et al., "Finding Reusable UML Sequence Diagrams Automatically", IEE Software, 2004, pp. 60-67.

Jin et al., "Automated Requirements Elicitation: Combining a Model-Driven Approach with Concept Reuse", International Journal of Software Engineering and Knowledge Engineering, vol. 13, No. 1, 2003, pp. 53-82.

* cited by examiner

Fig. 8 *Service Model*

Fig. 11　The deployment model

SERVICE ORIENTED ARCHITECTURE INDUSTRY MODEL REPOSITORY META-MODEL COMPONENT WITH A STANDARD BASED INDEX

BACKGROUND OF THE INVENTION

The present invention relates to meta-models and more specifically to a service-oriented architecture industry model repository meta-model with a standard based index and a visual interactive client.

Today enterprises are adopting a model-driven development (MDD) approach to architecting and designing both their business architecture and the supporting IT systems and applications. In order to promote the best practices and interoperability, both software vendors and industry associations are aggressively developing and marketing industry models to support MDD. Enterprises gain enormous benefits of industry models, such as reusability, automation, traceability and speed to market. Service-Oriented Architecture (SOA) projects receive acceleration from industry models.

There are strong requirements to map associations and create traceability of various types of industry models (e.g. processes, services and data models) in a meaningful granularity, and integrate with business requirements, goals and software development life cycle. However, because each type of industry models is created and maintained in its own tooling, building linkages across different tools in a meaningful granularity is very difficult.

Industry models are difficult to find within an enterprise since they can be stored in asset repositories, document management systems, websites, etc. . . . Plus, once they are found, it is challenging to link the various occurrences of the industry models together. It is also difficult to maintain associations between the abstract (a.k.a. master) and instance (a.k.a. customized) versions of industry models in a meaningful granularity. Furthermore, maintaining associations among different incarnations of models is also difficult.

With the challenges associated to linking the various occurrences of the industry models together, solutions currently used are to use a text search engine index and to define proprietary meta-models and manage associations in an industry model repository, typically in a relational database.

It is widely accepted in the Industry that the prescriptive reuse of models and other assets holds some promise in enabling the use of models to drive down the cost of software development and maintenance and therefore also make the use of model assets in the software development lifecycle accessible to a significantly broader group of practitioners than is the case today. It is therefore imperative that these practitioners have available a search mechanism to locate model assets in order to realize the potential of the model based approach to software development.

Many techniques are available to be used within a repository to search for assets. Recipes, taxonomies, ontologies, and classification schemas can all be used to aid in the search process. For example, a classification schema may be used to provide a structure for classifying assets. The values from the classification schema are stored in the asset's classification section. The most difficult and often least valuable approach for searching for assets is using keywords. However, using keywords is in fact the basis for most common search capabilities provided with model repositories today. The notion of expecting someone searching for specific assets to be able to enter a keyword that is exactly the same as was used when adding the asset (packaging the asset) into the repository is extremely hit and miss and results in many assets not being found. Furthermore, it is difficult enough even with structured searching mechanisms as above, to find and evaluate an asset, but it is even more difficult to understand how multiple assets can be used together when one is not familiar with them.

Two major styles of searching these kinds of repositories for specific content referred to as assets, are opportunistic searching and systematic searching. Assets may be organized and contained within folders in the repositories, which is an opportunistic approach to helping the user identify relevant assets.

With opportunistic searches, repositories are browsed, with or without a folder structure or searches based on keywords and phrases are conducted. While the text search engine index is easy to implement, it can only perform strict text search and the results are imprecise since they are based on the face value of text and lack inference logic and query language. The search results from the text search engine index will often result in too many results.

Proprietary meta models often use opportunistic searching since they can be constructed to allow precise and rich semantic indexing. The proprietary meta models manage abstract and not instance versions of industry models and is aware of artifacts in its own environment only. Opportunistic-style techniques are used in this kind of asset search and reuse, however searching in this manner is hit and miss and can therefore erode the value proposition of the assets, particularly if reuse is scaled to larger groups of people and across boundaries, teams, time zones, and skill sets.

The second style of searching is systematic searching which is a more prescriptive form of search. In systematic searching, associations among assets are defined or discovered and these relationships are used to narrow down and identify the assets being sought. Recipes are a good metaphor for this style of searching: In a recipe we have a list of ingredients (assets) and the guidance to "mix" them. Recipes also have the benefit of being customizable. Rather than searching for all the ingredients, a solution (the recipe) can be sought that points to all the ingredients (assets) needed. It offers the advantage of saving time. More value can be created by producing a set of recipes that mix multiple assets together to form larger-grained, yet customizable solutions.

SUMMARY OF THE INVENTION

According to one embodiment of the present invention a method of searching a service oriented architecture industry model repository is provided comprising a meta model service associated with a physical asset repository, the meta model service comprising: at least one topic map meta model with data specific to a particular topic or industry vertical included within an information model repository common meta-meta model, the information model repository common meta-meta model included within a meta-meta-meta model with a topic map based index. The method comprises: a computer receiving entry of a search term for the service oriented architecture industry model repository; the computer searching the service oriented architecture industry model repository for the search term; and displaying results of the searching of the service oriented architecture industry model repository as a topic map comprising data representing meta model service through a graphical interface.

According to another embodiment of the present invention a service oriented architecture (SOA) industry model repository (IMR) comprising a meta model service associated with a physical asset repository. The meta model service comprises at least one topic map meta model with data specific to a particular topic or industry vertical included within an information model repository common meta-meta model, and the information model repository common meta-meta model included within a meta-meta-meta model with a topic map based index; and a topic map displaying data representing the meta model service. The data from the at least one topic map meta model with data specific to a particular topic or industry vertical, data from the information model repository common meta-meta model, and data from the meta-meta-meta model with a topic map based index is transformed into the topic map for display through an interface.

DETAILED DESCRIPTION OF THE INVENTION

Figure 1:
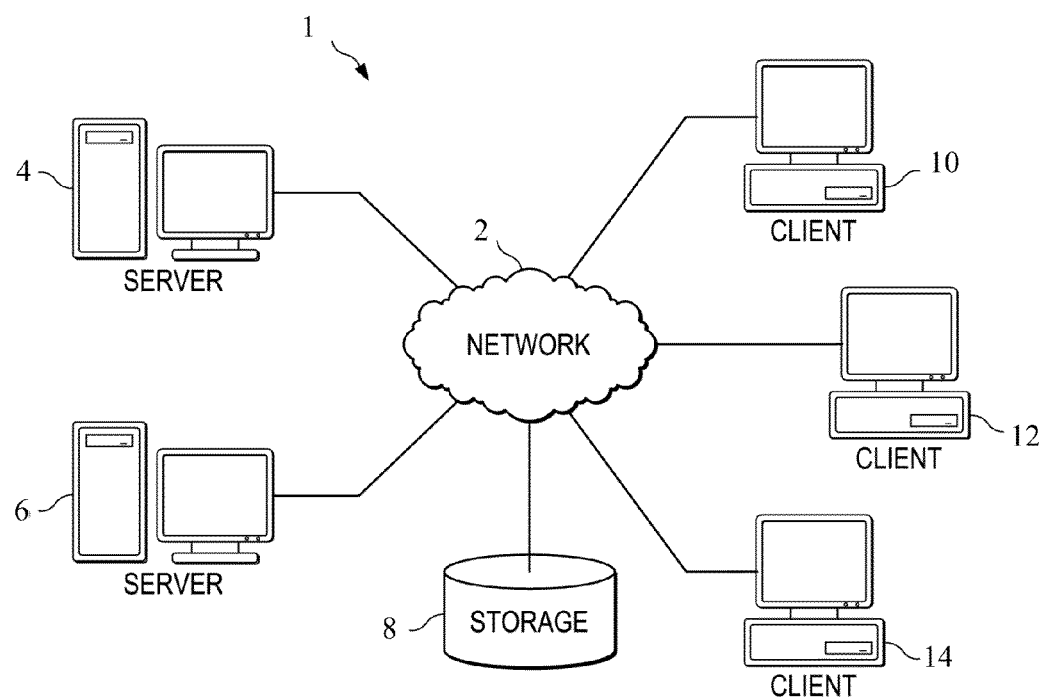
FIG. 1 is a computer network in which illustrative embodiments may be implemented.
Figure 2:
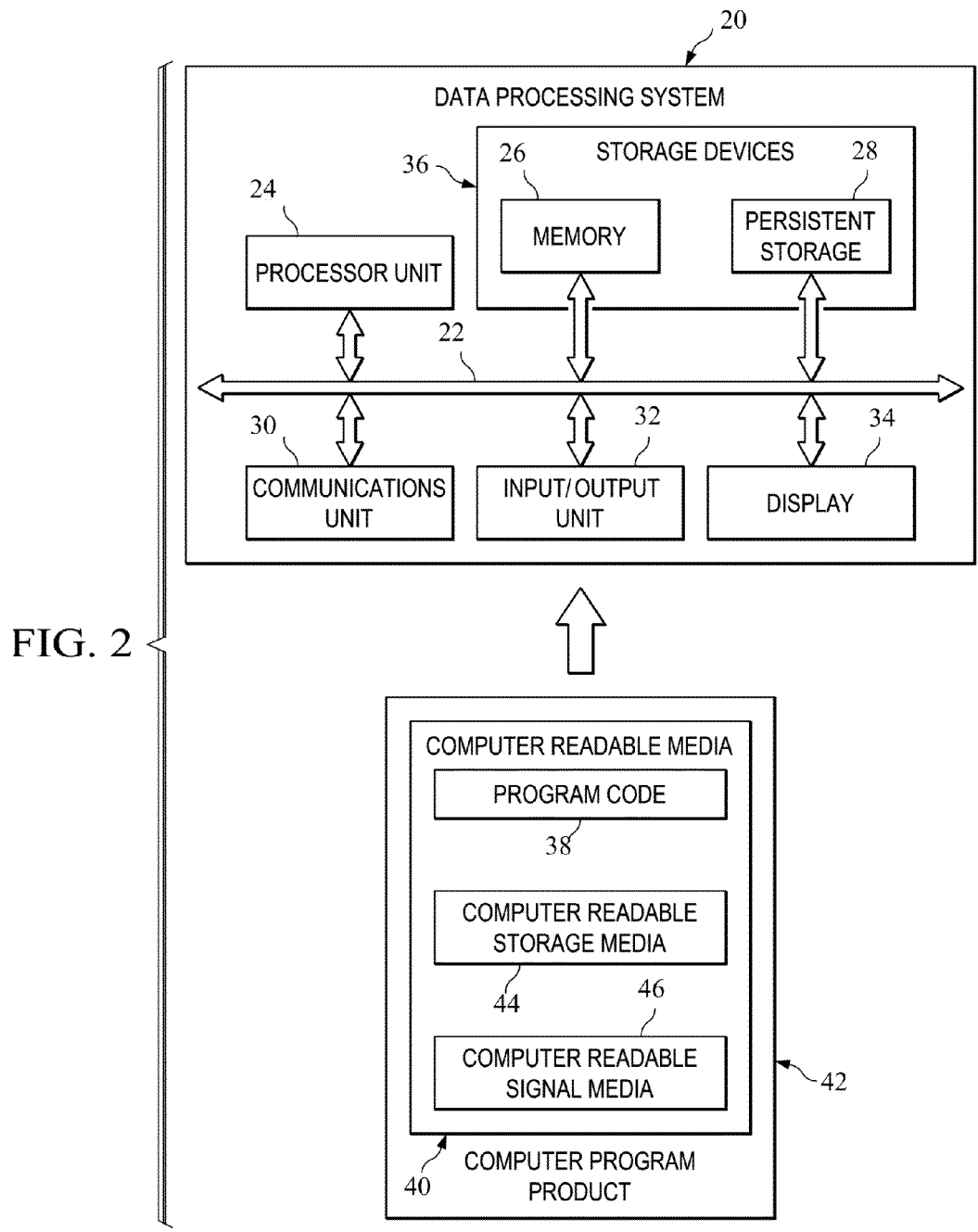
FIG. 2 is a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 1 is a network of computers in which the illustrative embodiments may be implemented. Network data processing system 1 contains network 2, which is the medium used to provide communication links between various devices and computers connected together within network data processing system 1. Network 2 may include connections, such as wire, wireless communication links, or fiber optic cables.

In the depicted example, server 4 and server 6 connect to network 2 along with storage unit 8. In addition, clients 10, 12, and 14 connect to network 2. Clients 10, 12, and 14 may be, for example, personal computers or network computers. In the depicted example, server 4 provides information, such as boot files, operating system images, and applications to clients 10, 12, and 14. Clients 10, 12, and 14 are clients to server 4 in this example. Network data processing system 1 may include additional servers, clients, and other devices not shown.

Program code located in network data processing system 1 may be stored on a computer recordable storage medium and downloaded to a data processing system or other device for use. For example, program code may be stored on a computer recordable storage medium on server 4 and downloaded to client 10 over network 2 for use on client 10.

In the depicted example, network data processing system 1 is the Internet with network 2 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1 also may be implemented as a number of different types of networks, such as, for example, an intranet, a local area network (LAN), or a wide area network (WAN). FIG. 1 is intended as an example, and not as an architectural limitation, for the different illustrative embodiments.

With reference now to FIG. 2, a block diagram of a data processing system is shown in which illustrative embodiments may be implemented. Data processing system 20 is an example of a computer, such as server 4 or client 10 in FIG. 1, in which computer usable program code or instructions implementing the processes may be located for the illustrative embodiments. In this illustrative example, data processing system 20 includes communications fabric 22, which provides communications between processor unit 24, memory 26, persistent storage 28, communications unit 30, input/output (I/O) unit 32, and display 34.

Processor unit 24 serves to execute instructions for software that may be loaded into memory 26. Processor unit 24 may be a set of one or more processors, or may be a multiprocessor core, depending on the particular implementation. Further, processor unit 24 may be implemented using one or more heterogeneous processor systems in which a main processor is present with secondary processors on a single chip. As another illustrative example, processor unit 24 may be a symmetric multi-processor system containing multiple processors of the same type.

Memory 26 and persistent storage 28 are examples of storage devices 36. A storage device is any piece of hardware that is capable of storing information, such as, for example, without limitation, data, program code in functional form, and/or other suitable information either on a temporary basis and/or a permanent basis. Memory 26, in these examples, may be, for example, a random access memory or any other suitable volatile or non-volatile storage device. Persistent storage 28 may take various forms depending on the particular implementation. For example, persistent storage 28 may contain one or more components or devices. For example, persistent storage 28 may be a hard drive, a flash memory, a rewritable optical disk, a rewritable magnetic tape, or some combination of the above. The media used by persistent storage 28 also may be removable. For example, a removable hard drive may be used for persistent storage 28.

Communications unit 30, in these examples, provides for communications with other data processing systems or devices. In these examples, communications unit 30 is a network interface card. Communications unit 30 may provide communications through the use of either or both physical and wireless communication links.

Input/output unit 32 allows for input and output of data with other devices that may be connected to data processing system 20. For example, input/output unit 32 may provide a connection for user input through a keyboard, a mouse, and/or some other suitable input device. Further, input/output unit 32 may send output to a printer. Display 34 provides a mechanism to display information to a user.

Instructions for the operating system, applications, and/or programs may be located in storage devices 36, which are in communication with processor unit 24 through communications fabric 22. In these illustrative examples the instructions are in a functional form on persistent storage 28. These instructions may be loaded into memory 26 for running by processor unit 24. The processes of the different embodiments may be performed by processor unit 24 using computer implemented instructions, which may be located in a memory, such as memory 26.

These instructions are referred to as program code, computer usable program code, or computer readable program code, that may be read and run by a processor in processor unit 24. The program code in the different embodiments may be embodied on different physical or tangible computer readable media, such as memory 26 or persistent storage 28.

Program code 38 is located in a functional form on computer readable media 40 that is selectively removable and may be loaded onto or transferred to data processing system 20 for running by processor unit 24. Program code 38 and computer readable media 40 form computer program product 42 in these examples. In one example, computer readable media 40 may be in a tangible form, such as, for example, an optical or magnetic disc that is inserted or placed into a drive or other device that is part of persistent storage 28 for transfer onto a storage device, such as a hard drive that is part of persistent storage 28. In a tangible form, computer readable media 40 also may take the form of a persistent storage, such as a hard drive, a thumb drive, or a flash memory that is connected to data processing system 20. The tangible form of computer readable media 40 is also referred to as computer recordable storage media. In some instances, computer readable media 40 may not be removable.

Alternatively, program code 38 may be transferred to data processing system 20 from computer readable media 40 through a communications link to communications unit 30 and/or through a connection to input/output unit 32. The communications link and/or the connection may be physical or wireless in the illustrative examples.

In some illustrative embodiments, program code 38 may be downloaded over a network to persistent storage 28 from another device or data processing system for use within data processing system 20. For instance, program code stored in a computer readable storage medium in a server data processing system may be downloaded over a network from the server to data processing system 20. The data processing system providing program code 38 may be a server computer, a client computer, or some other device capable of storing and transmitting program code 38.

The different components illustrated for data processing system 20 are not meant to provide architectural limitations to the manner in which different embodiments may be implemented. The different illustrative embodiments may be implemented in a data processing system including components in addition to, or in place of, those illustrated for data processing system 20. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 20 is any hardware apparatus that may store data. Memory 26, persistent storage 28 and computer readable media 40 are examples of storage devices in a tangible form.

In another example, a bus system may be used to implement communications fabric 22 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 26 or a cache such as found in an interface and memory controller hub that may be present in communications fabric 22.

In accordance with one embodiment, a service oriented architecture component that builds meta-model services, and manages and maintains complex associations between requirements and various model assets. The meta-model is based on topic maps ISO standard. This component enables the engineering of a flexible dynamic framework to index, map and manage industry models by the concept of decoupling an asset from its physical occurrence. The industry model repository (IMR) using ISO-standard topic maps as a meta model includes an advanced search tool using visual techniques within a rich client for example Topic maps, providing a visual navigational aid to a user.

Figure 3:
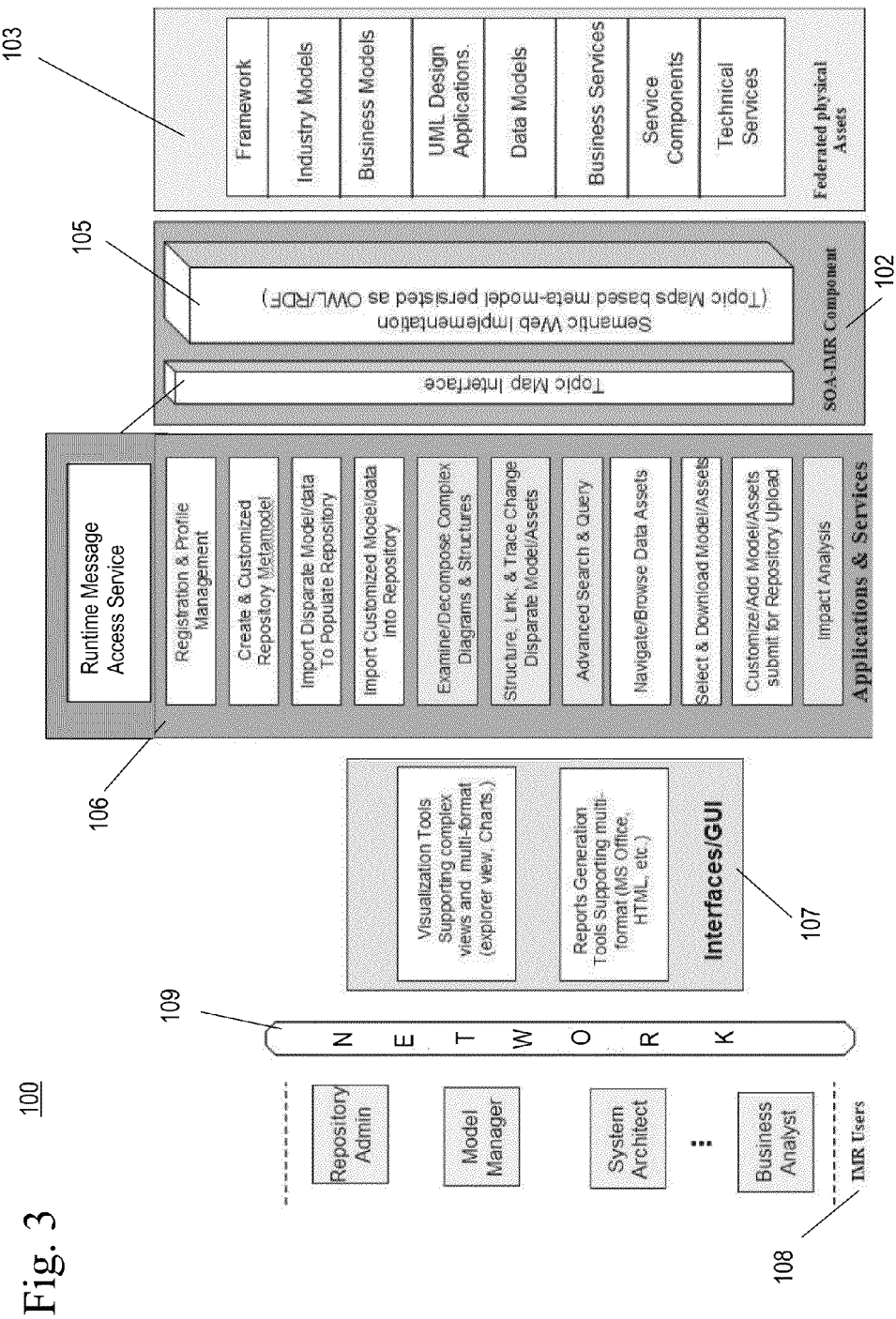
FIG. 3 shows an overview of an industry model repository (IMR) solution architecture system including a service oriented architecture (SOA) industry model repository (IMR) component.

FIG. 3 shows the IMR architecture system 100 which may be part of the network data processing system 1 shown in FIG. 1 and includes a service oriented architecture (SOA) industry model repository (IMR) component 102. The SOA-IMR component 102 provides tools to facilitate the consumption and reuse of the model assets through topic map IMR meta model creation and topic map interface 104 and semantic web implementation 105 which represent and implement the IMR meta models using semantics provide by the OWL language. The SOA IMR component 102 is described in greater detail below. In the semantic web implementation a topic map would be automatically converted to an OWL-DL representation and stored in a semantic web RDF repository, such as a Sesame RDF server. The Sesame RDF server is an open source framework for querying and analyzing RDF data.

The semantic web RDF repository allows for versioning and merging of asset-requirement topic maps. With versioning and merging of asset-requirement topic maps, topic maps may be built by different domain experts and organized in conceptual spaces according to meaning. For example, a domain expert could build up an asset—requirements topic map in the SOA information service space and another domain expert could build an assets-requirements topic map in the integration services space and both maps could then be easily merged together to provide multiple view on the topic map based on the role of who is using them. A user would only need to see the relevant subset of the asset-requirement topic map to help understand what particular assets are relevant to his requirements. An asset requirements domain expert would only see the relevant services topic map for his domain. An asset-requirements topic map admin would be able to see and navigate the entire map, create new association type of new topic types.

By providing an implementation for converting the SOA IMR topic map meta model to a semantic representation, the standards based query language of SPARQL Protocol and RDF Query Language (SPARQL) may be used to query the SOA IMR topic map meta model. SPARQL allows for very fast querying, will scale to millions of data items. Another advantage is that the requirement maps are maintained and information is kept up to date. By using a standards based query language, search and query requirement maps to understand the suitable industry model assets or combinations of assets to be used for a particular set of requirements. Querying of relevant information about a particular model asset can be carried out using the standard based query language, such as where the particular model asset can be found and what assets the particular model asset can be used in conjunction with new information such as associations between using assets can be uncovered using inference technology such as semantic web based query languages, such as SPARQL to provide answers to queries across the asset-requirements topic maps. The selection of an RDF based repository like Sesame provides support for the kind of querying to determine all of the assets that can be used to satisfy a particular requirement, even though some assets do not have explicit relationships with the requirement.

By using semantic web technologies of the World Wide Web Consortium (W3C), such as OWL and RDF a user has the OWL capabilities and tools for expressing constraints, doing constraint checking and automated reasoning/inference, and for querying and visualization of ontology. In addition using semantic web technologies for converting the SOA IMR topic map meta model to an OWL-DL representation also has many additional benefits. Using semantic web technology allows the complex model-model, model requirement, and requirement-requirement associations both abstract and instance data to be expressed mathematically inform of triples (subject, predicate) which may be continuously checked for consistency to ensure the integrity of the data. Automatic tools can be used for consistency checking. Additional constrains can also be introduced depending on the particular industry model. Since the semantic web technologies are mathematically based, inference of the data can be performed to identify new associations. By using standard XML based technologies of the World Wide Web Consortium (W3C) such as OWL and RDF, a variety of tools such as security can be leveraged. Controlled access to the topic maps, maps or subsection of the maps is supported using the family of XML security based standards. Block 105 is discussed in further detail in an application entitled, "IMPLEMENTING SERVICE ORIENTED ARCHITECTURE INDUSTRY MODEL REPOSITORY USING SEMANTIC WEB TECHNOLOGIES" filed concurrently and is hereby incorporated by reference.

The IMR architecture system 100 includes federated physical model assets 103 that are stored in different types of repositories depending on the model driven framework tools and products that are being deployed by the system. The federated physical assets may include framework, industry models, business models, UML design applications, data models, business services, service components, and technical services. The federated physical assets are not limited to the assets shown in FIG. 3.

Applications and services 106 are provided to IMR users 108 through the network 109 using interfaces 107. The interfaces used by the IMR users 108 includes reports generation and tools supporting multi-formats and visualization tools supporting complex views. The applications and services 106 may include runtime message access service, registration and profile management; creating and customizing repository meta model, importing customized and disparate model/data into the depository, examining/decomposing complex diagrams and structures, structure, link, and trace change disparate model/assets; advanced search and query, navigate/browse data assets; select and download model/assets, customize/add models/assets submit for repository upload; and impact analysis. The application and services are not limited to the assets shown in FIG. 3. The applications and services are described in greater detail in applications entitled "FRAMEWORK TO POPULATE AND MAINTAIN A SERVICE ORIENTED ARCHITECTURE INDUSTRY MODEL", "MANAGING AND MAINTAINING SCOPE IN A SERVICE ORIENTED ARCHITECTURE INDUSTRY MODEL REPOSITORY", "RECOGNITION OF AND SUPPORT FOR MULTIPLE VERSIONS OF AN ENTERPRISE CANONICAL MESSAGE MODEL", "IMPLEMENTING SERVICE ORIENTED ARCHITECTURE INDUSTRY MODEL REPOSITORY USING SEMANTIC WEB TECHNOLOGIES" filed concurrently with the present application. These applications are hereby incorporated by reference. The interfaces 107 are further described in greater detail below.

The IMR users 108 may include but are not limited to repository administrator, model manager, system architect, and business analyst.

Figure 4:
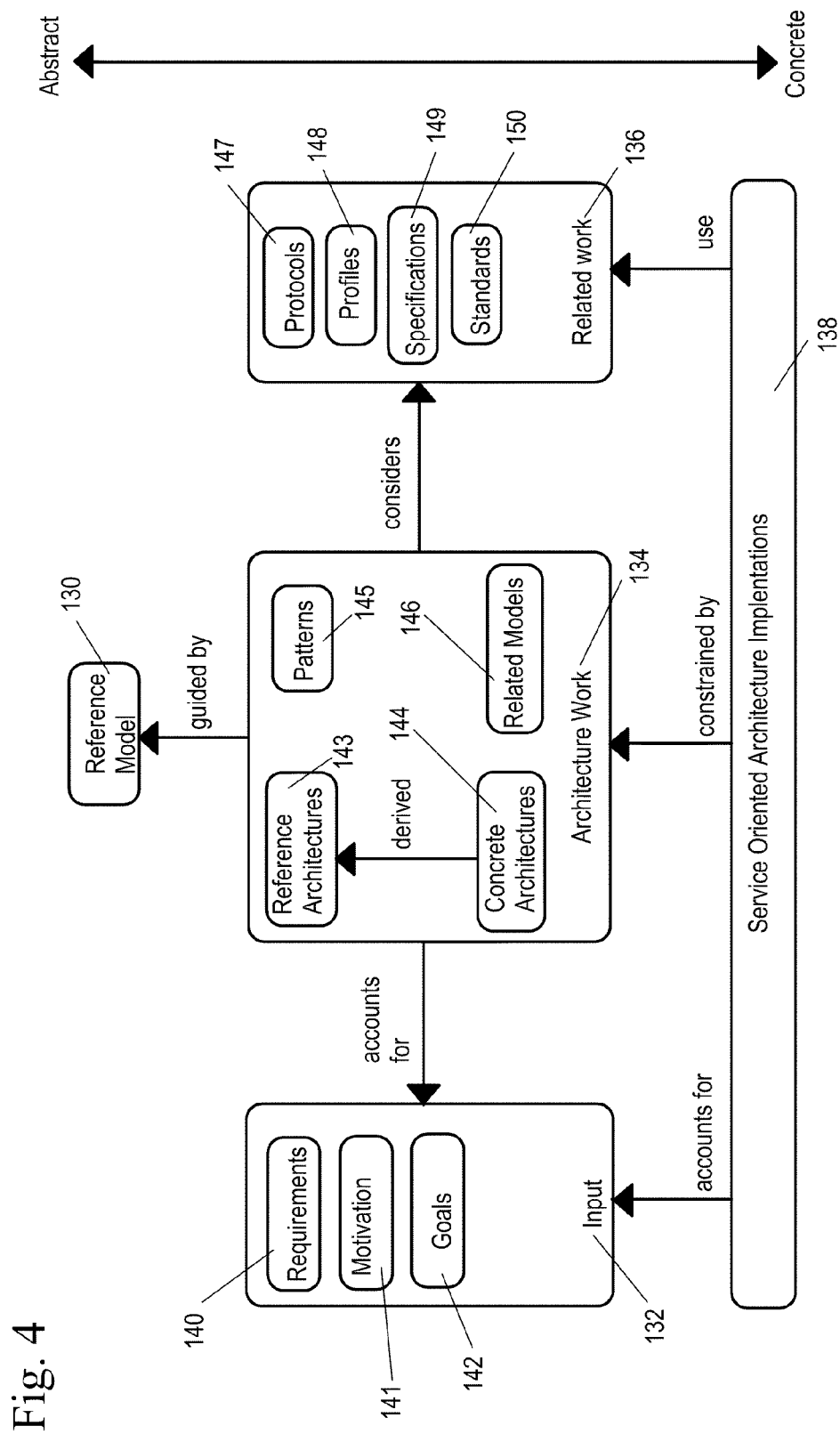
FIG. 4 shows an organization for the advancement of structured information standards (OASIS) reference model for service oriented architecture (SOA).

FIG. 4 shows a reference model 130 for service oriented architecture (SOA) as supplied by the organization for the advancement of structured information standards (OASIS). The service oriented architecture (SOA) implementation 138 accounts for what is inputted 132, for example requirements of the architecture 140, motivation 141, and goals 142. The SOA implementation 138 uses related work 136 such as protocols 147, profiles 148, specifications 149, and standards 150. In addition, the SOA implementation 138 is constrained by the architecture work 134 which includes patterns 145, related models 146, concrete architectures 144 derived from reference architectures 143. The architecture work 134 is guided by an overall reference model 130. The architecture work 134 accounts for the input 132 and considers related work 136.

Figure 5:
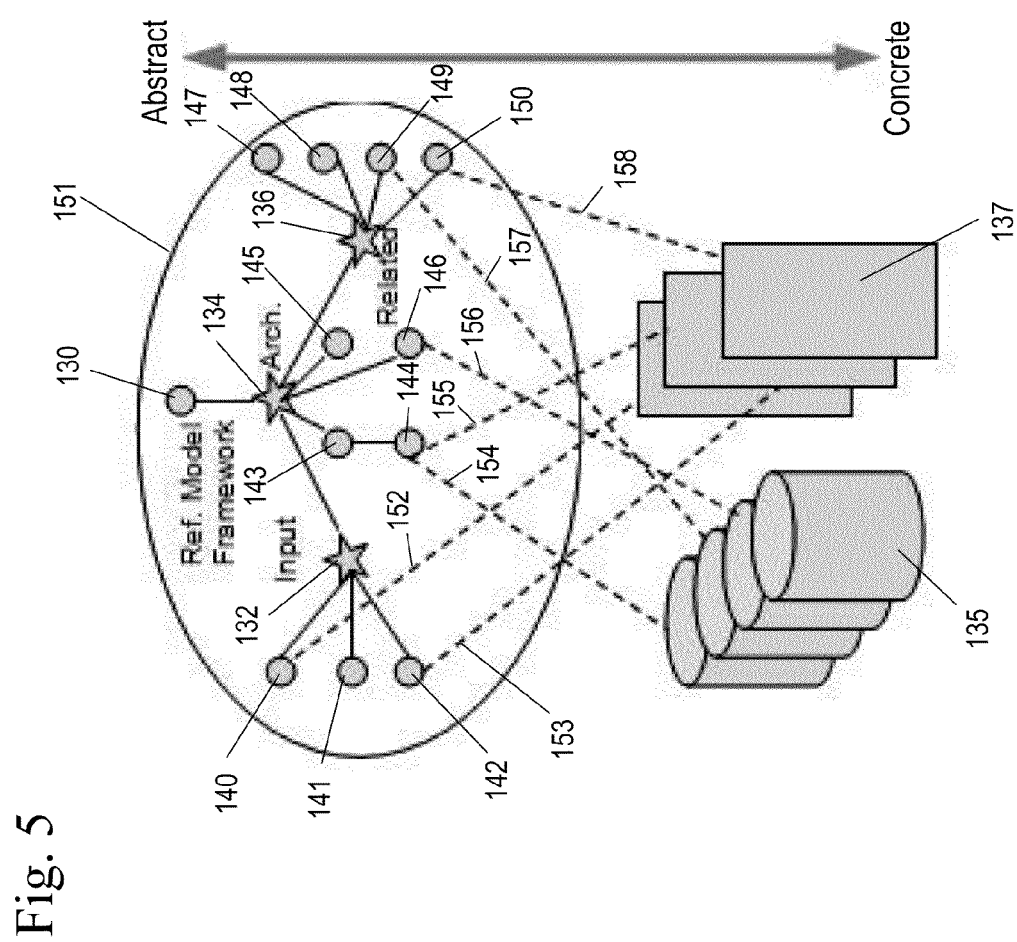
FIG. 5 shows a topic map representation of FIG. 2.

FIG. 5 shows a topic representation of the reference model for SOA as shown in FIG. 4. The topic map of FIG. 3 shows the relationship between software requirement and the industry models needed to satisfy those requirements. The reference model 130 framework of FIG. 2 is shown within the cloud 151 of the topic map and is associated with a topic of architecture work 134. The topic of architecture work 134 is associated with the topic input 132 and the topic of related work 136. The topic of input 132 is associated with the topics of requirements 140, motivation 141 and goals 142. The requirements 140 topic and the goals 142 topic each have occurrences 152, 153 in documents 137. The architecture work 134 topic is associated with the related work 136 topic, the reference architectures 143, patterns 145, and related model 146 topics. The concrete architecture 144 topic has physical occurrences 154, 155 in databases 135 and in documents 137. The related model 146 has a physical occurrence 156 in databases. The related work 136 topic is associated with protocols 147, profiles 148 specifications 149, and standards 150 topics. The specification topic 149 has a physical occurrence 157 in databases 135 and the standards topic 150 has a physical occurrence 158 in documents 137.

By placing the reference model of an SOA into a topic map, the decoupling of an asset from its physical occurrence occurs. In other words, creating an index of information which resides outside of that information is possible.

Figure 6:
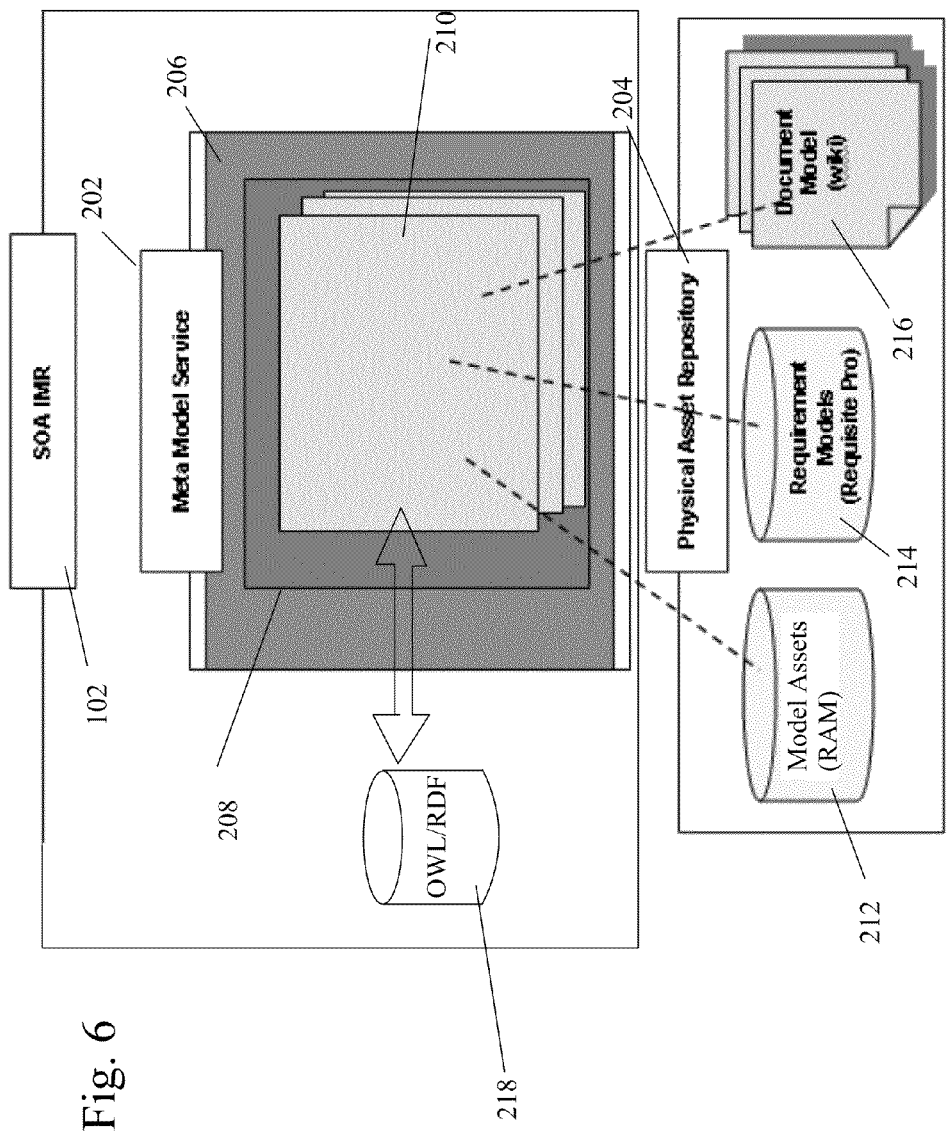
FIG. 6 shows an overview of a service oriented architecture (SOA) industry model repository (IMR) meta-model.

FIG. 6 shows a service oriented architecture (SOA) industry model repository (IMR) component 102 from FIG. 3 in greater detail. The SOA IMR component 102 includes a Meta Model Service 202 associated with the physical asset repository. Within the meta model service 202 is a meta-meta-meta model 206 with a topic map based index, an information model repository (IMR) common meta-meta model 208 and at least one topic map meta model 210 with data specific to a particular topic or industry vertical. The topic map meta model 210 is associated with the physical asset repository 204 of model assets (RAM) 212, requirement models 214, and document models (wiki) 216.

Figure 7:
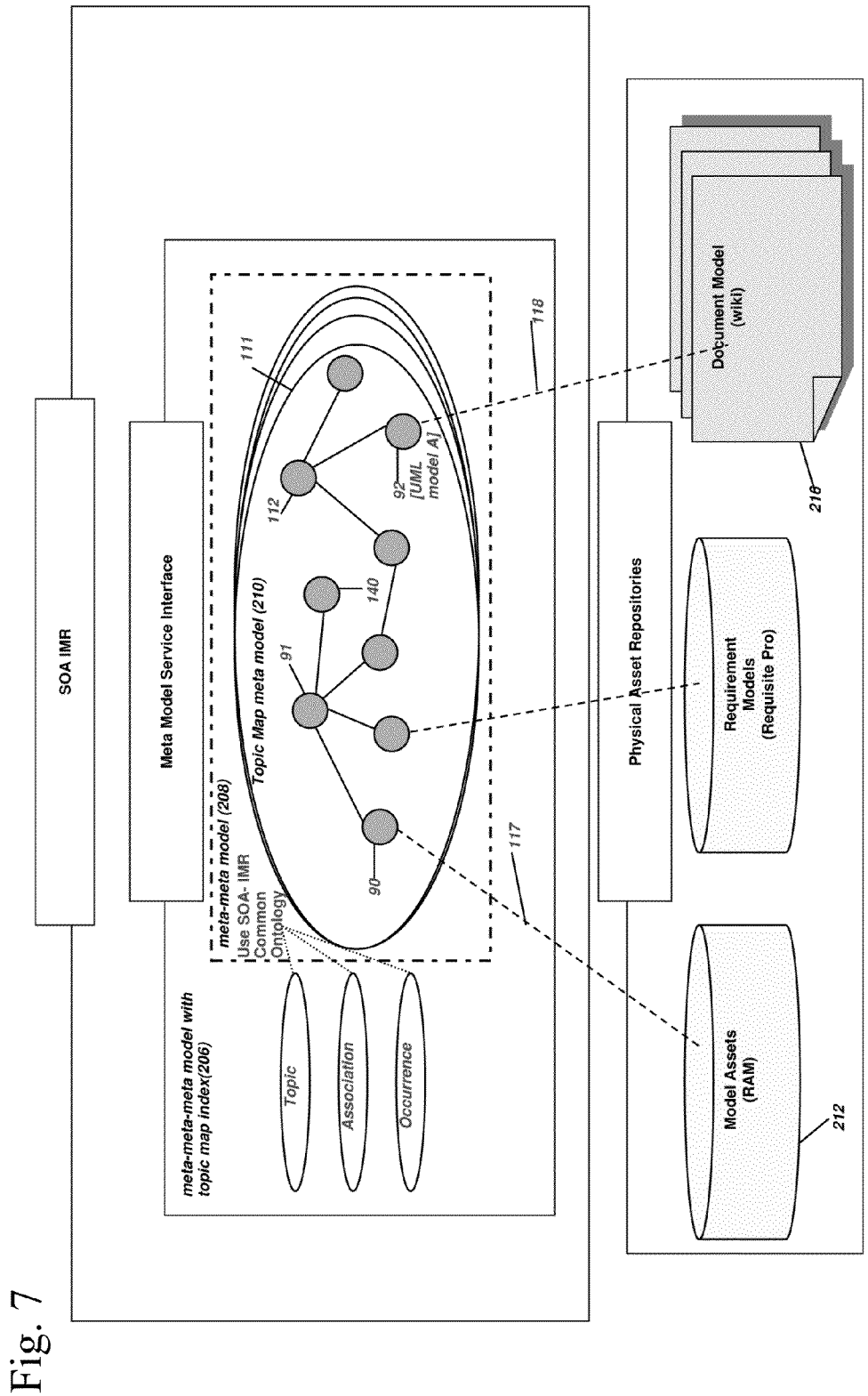
FIG. 7 shows a topic map used with the service oriented architecture (SOA) industry model repository (IMR) meta-model.

FIG. 7 shows a topic map of the SOA IMR. The cloud or topic map 111 has topics (circles), which may be any of the meta models present in the meta model service or in the physical asset repository 204. For example if topic 90 was a model asset that existed in a RAM repository 212, it would be associated with another topic 91 which may be an industry vertical meta model 140. Topic 90 may have occurrences in databases shown through a uniform resource identifier (URI) 117, shown by the dashed lines. Other topic 92 may have occurrences in documents 216 through URIs 118. By using topic maps as the repository internal meta model, a web service may programmatically access, manage, and maintain the SOA IMR meta model.

The internal meta model service 202 of the SOA IMR component 102 is the SOA IMR meta-model service using ISO/IEC Standard (ISO 13250-1) topic map meta models 210. Topic Maps map both web and real-world information resources, by reifying real-world resources as "subjects", and creating "topic" constructs to capture their characteristics and relationships with other topics and subjects. By using the topic maps meta models 206, 208, 210 as the repository internal meta model, a common meta model service interface 202 allow users to programmatically access, manage, and maintain these meta models.

Some of the advantages of using a topic map based meta model for the IMR are that the topic maps are independent of the implementation and are reusable for other service consumers. Topic maps can map to multiple occurrences and each model can be stored in different locations as different types of physical occurrences. Furthermore, the IMR meta model service provides and supports full read and write capabilities abstract and instance data about an industry model.

Figure 8:
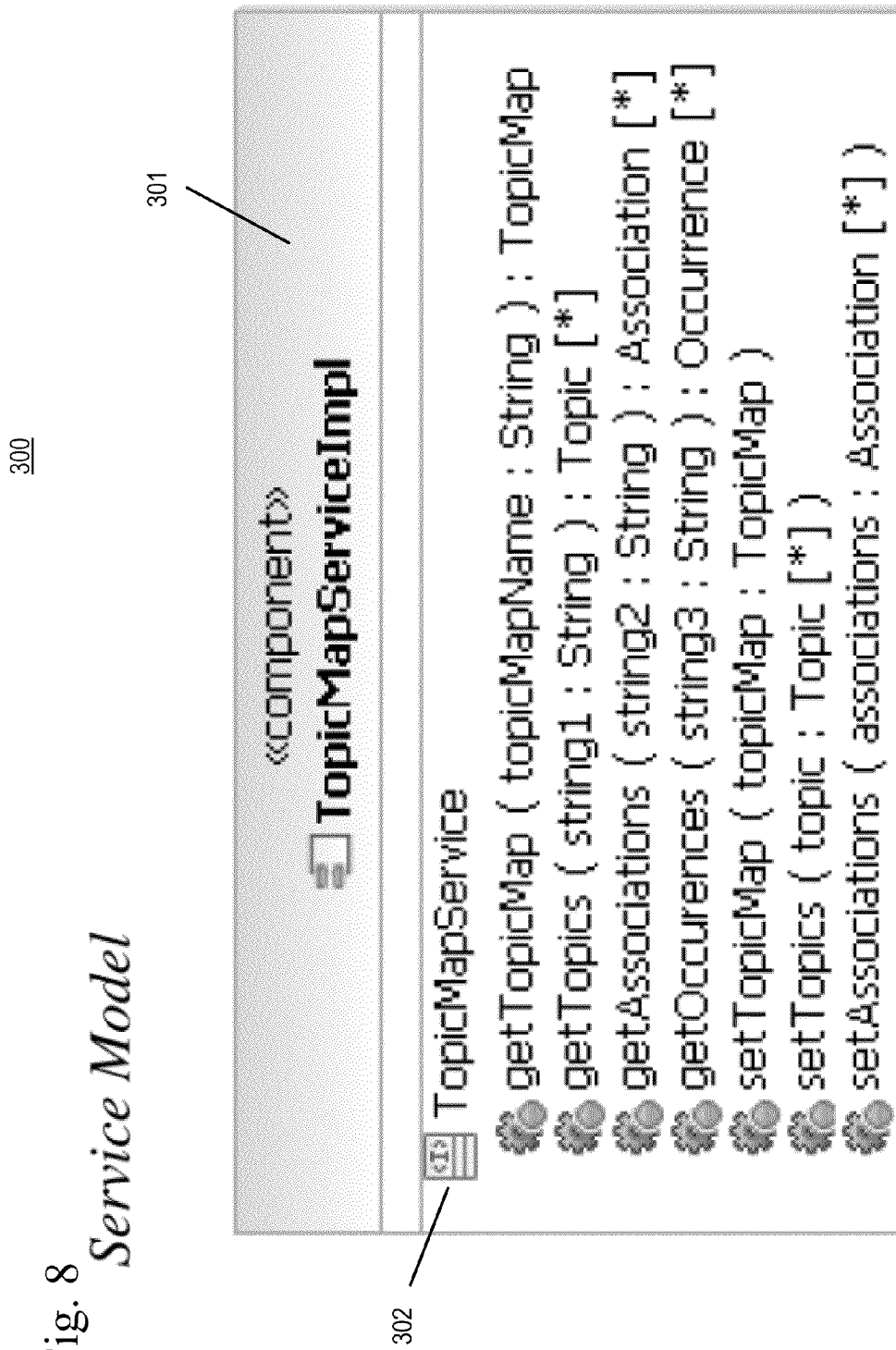
FIG. 8 shows a service model of the IMR SOA.
Figure 9:
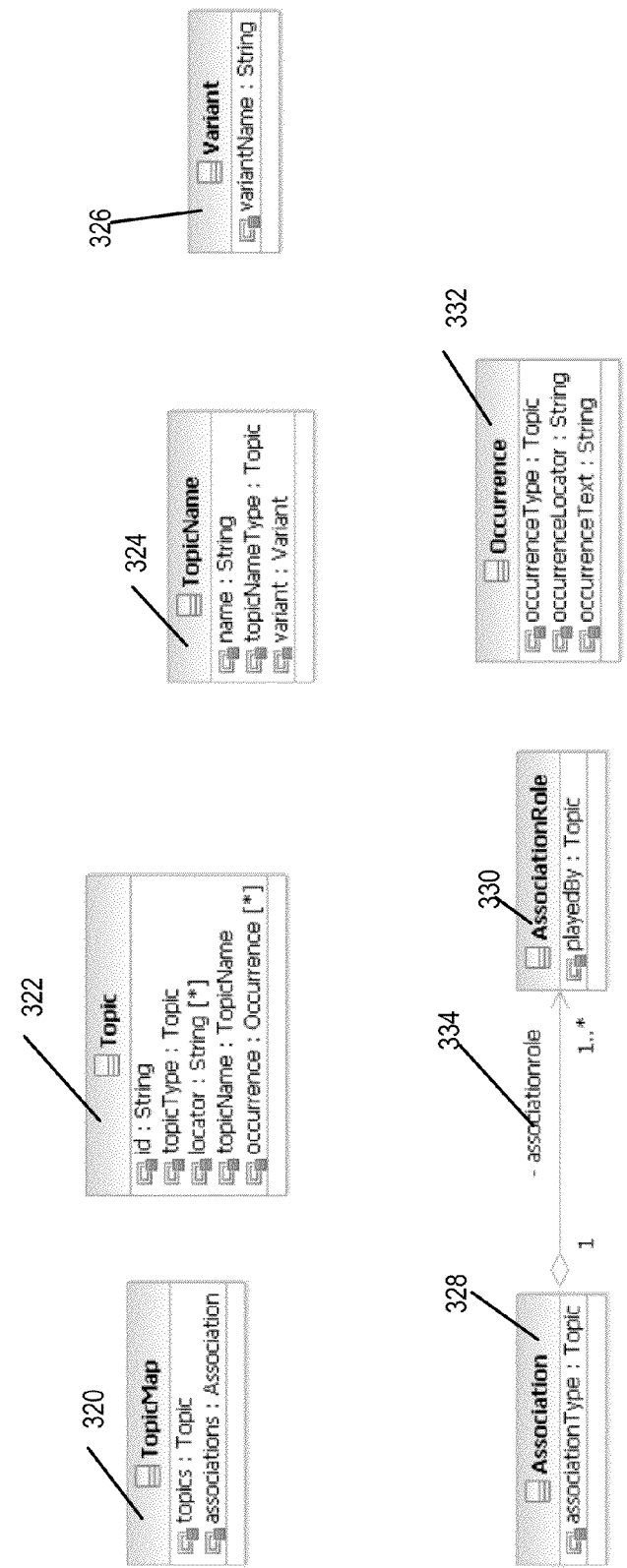
FIG. 9 shows a message model of the IMR SOA.

The SOA IMR meta model has create, read, update, and delete (CRUD) access through the service model and message models of FIGS. 8 and 9. The interface and deployment of the service and message models are shown in FIGS. 10 and 11 respectively.

The service model 300 shown in FIG. 8 includes a TopicMapServiceImpl component 301 with a TopicMapService port 302 and numerous operations including getting the TopicMap, Topics, Associations, and Occurrences and setting the TopicMap, Topics, and Associations. The service model is not limited to the operations shown.

FIG. 9 shows messages the service model 300 will send and receive in a message model 318. The messages pertain to TopicMap 320, Topic 322, TopicName 324, Association 328 and AssociationRole 330, Occurrence 332, and Variant 326. Association 328 is associated 334 with AssociationRole 330.

Figure 10:
FIG. 10 shows a unified modeling language (UML) class diagram exhibiting an example of a Java implementation of the SOA-IMR meta data management interface.
Figure 11:
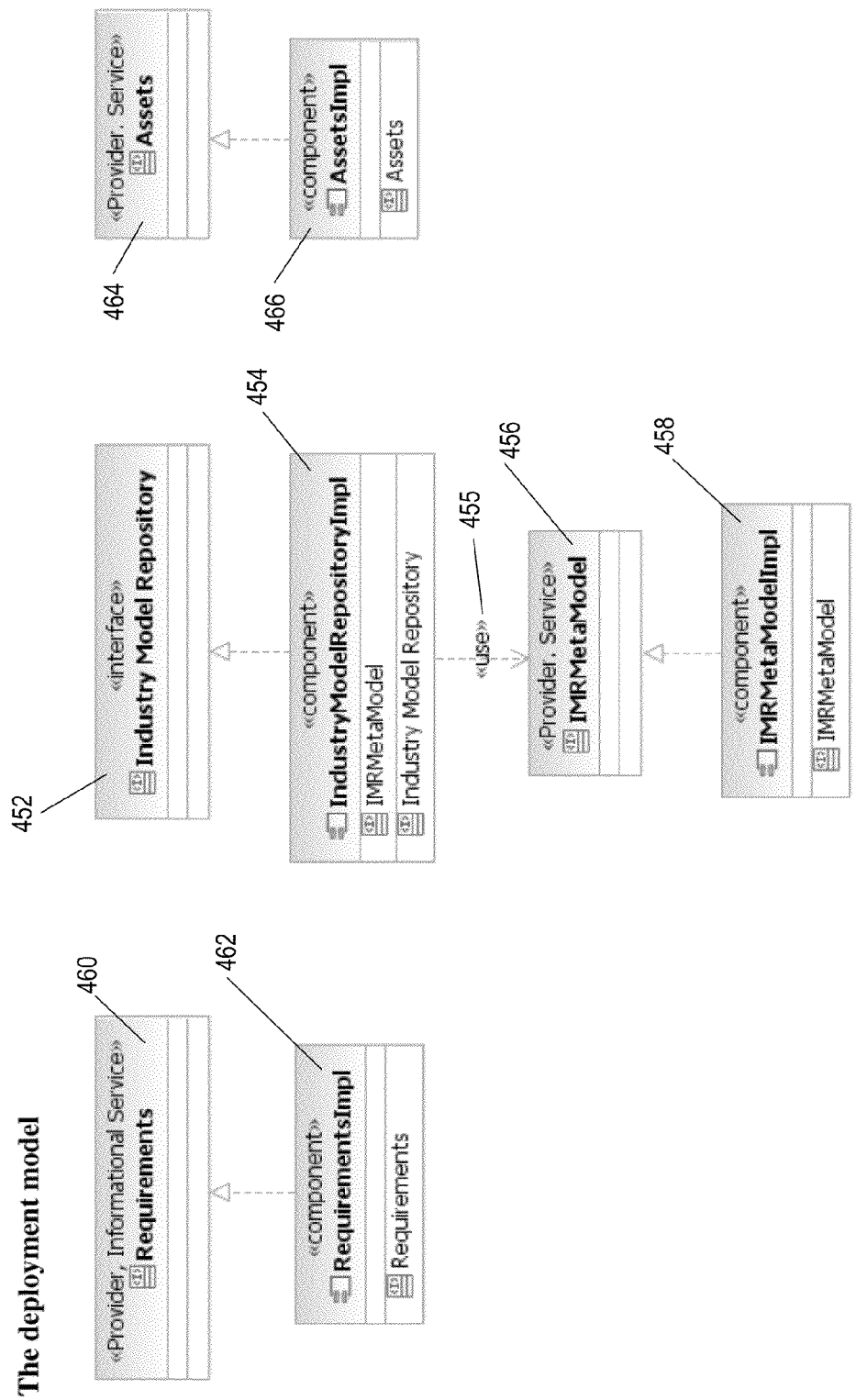
FIG. 11 shows a deployment model of the IMR SOA.

FIG. 10 shows a UML class diagram exemplifying a Java™ implementation of the SOA IMR interface. The TopicMapService port interface 402 is implemented by the TopicMapServiceBindingImpl 404. The TopicMapServiceBindingImpl 404 uses 410, 411 a CacheManagerSingleton 406 to add and remove an item from cache and a Controller 408 to create or get Associations, Occurrence, Topics, TopicMap and set Associations and Topics.

FIG. 11 shows a deployment model 450 on how to access the service model 300. The industry model repository has an interface implemented by the IndustryModelRepositoryImpl 454 with ports to the IMR meta model and the IMR provider. The IndustryModelRepositoryImpl 454 uses 455 IMRMetaModel 456 port as a provider and service and the IMRMetaModel 456 is implemented by the IMRMetaModelImpl 458. The Requirements 460 provider and informational service is implemented by the RequirementsImpl component 462. The Assets 464 provider and service is implemented by the AssetsImpl 466.

Figure 12:
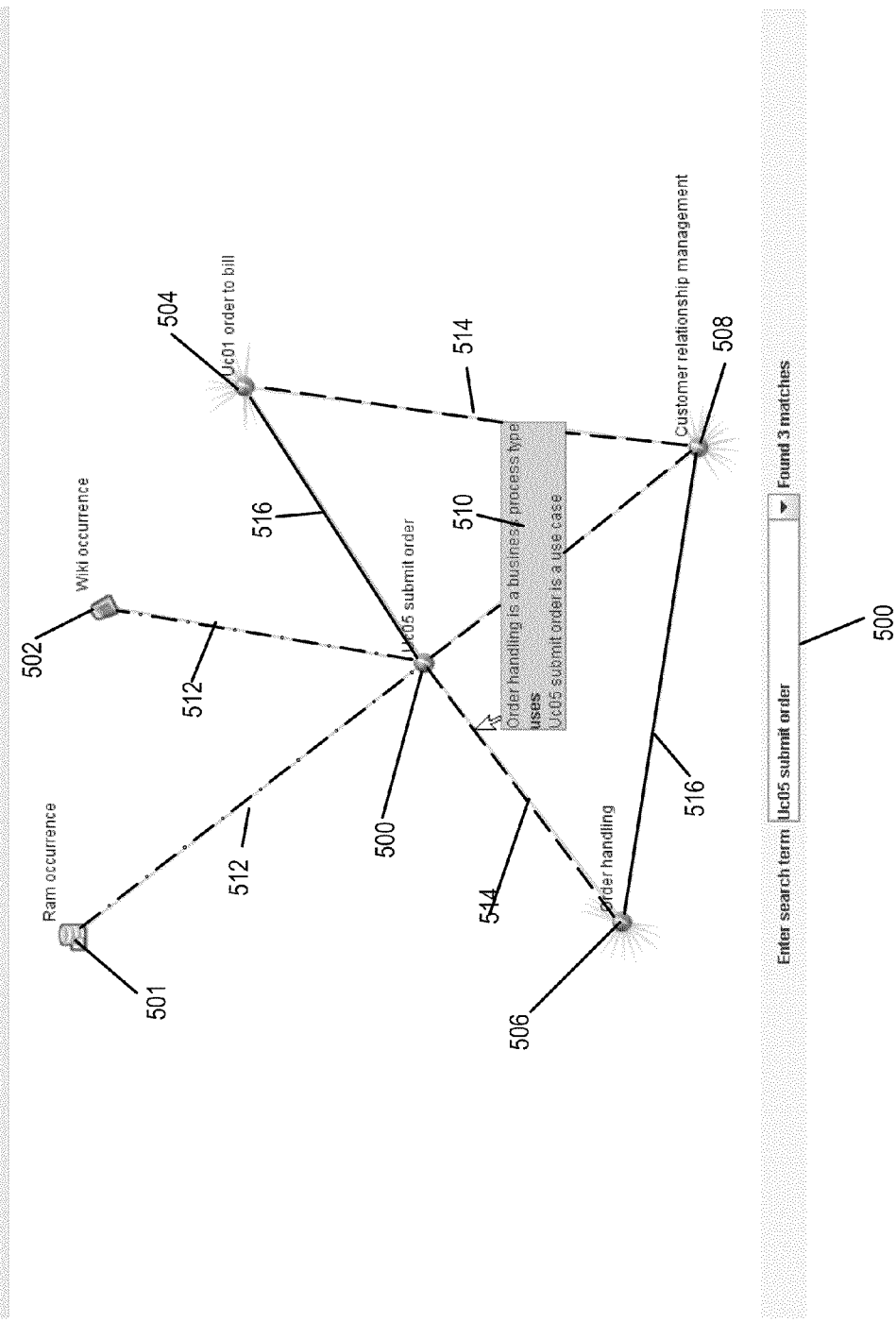
FIG. 12 shows an image of an industry model repository viewer with client relationship visualization.

A visually rich client graphically displays assets found as the result of a requirements, e.g. "Uc05 submit order" based search request that graphically shows the association information between the asset results, for example as shown in FIG. 12. The visual client may be packaged within a repository or using a standard developer platform that may be web based, for example an Eclipse plugin. The client also allows an IMR user 108 to source a particular subset of the asset results.

Referring now to FIG. 6, an IMR user 108 (shown in FIG. 3) with an initial "search and query" service request sends the "requirement" to the SOA meta model service 202 of the SOA IMR component 102 through the "Advanced Search and Query" service in the Applicant & Services component 106 using a graphically enabled RAM rich client 107. The client graphically displays the results as a topic map to the user 108. The search results are provided by SOA IMR 102 component. The topic map would have the user "requirement" as the central node and associated with that node are all the models that are used to satisfy that requirement such as a use case model, business services models, business process models, and associated data models. Each of the occurrence icons on the graphical display is clickable by the user. For example, if the user wants to load a UML model A, such as a requirements model, into their tool, the user would select the UML model occurrence icon of model A. Model A may have multiple occurrences and may also have an occurrence in a document described on an outside web site. When the user selects UML model A, a link to the associated URL will be provided if an occurrence of model A occurs on an outside website. Once the user 108 has selected the model's occurrence icon, the client loads the appropriate SOA models into the SOA IMR component 102 through the "Application & Services" component 106 and ultimately makes them available for re-use. The interactive interface 107 of the client 108 communicates to the user the conformance of the uploaded assets with industry standards or specifications and prompts the asset owners with any error messages that may occur. The user may edit and correct the flagged errors.

The client may be packaged as an Eclipse client and be provided by a vendor specialized in providing software development tools and products or deployed inside bigger scope modeling tools, for example IBM® Rational® Software Architect or WebSphere® Business Modeler, products of International Business Machines Corporation. FIG. 12 shows an example of a graphical display using an Eclipse client. The IMR user 108 sent the search request for the "Uc05 submit order" 500 to the SOA IMR component 102. The IMR model assets are searched and a returned list of relevant model assets. The lines 512 may be marked to show physical occurrences of model assets. For example in FIG. 10, "Uc05 submit order" 500 has a physical occurrence in RAM 501 and in wiki 502 and is indicated by lines 512 which are marked as dash dot. The lines 516 may also be marked to indicate the relationship between similar asset types and are shown as a solid line. For example in FIG. 10, "Uc05 submit order" 500 use case is a child use case of the parent use case called "Uc01 order to bill" 504 and is indicated by line 516. Other lines 514 are marked to indicate what other model assets can be used together and are shown as dashed lines. For example in FIG. 10, "uc05 submit order" 500 may be used with "Order handling" 506 and "Customer relationship management" 508 and "Uc01 order to bill" 504 may be used with "Customer relationship management" 508. Additionally, information regarding the relationship between the nodes may be revealed to a user by mousing over the lines that connect the nodes together as indicated by box 510.

When the reuse scope and community of an IMR is broad and crosses organizational boundaries, time zones, skill sets, and other elements, and as the number of assets grow in a repository, users need a searching mechanism that allows the user to navigate the structure itself, e.g. classification schema or taxonomy, from which to select values. Ontologies model the grammar of a domain and create relationships amount terms.

Topic maps are used to model the function and non-functional relationship between the software requirement and the industry models needed to satisfy those requirements. Topic maps are particularly suitable to represent and index vast amounts of knowledge in the service oriented architecture.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable data storage medium may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable data storage medium may be any medium that can store the program for use by or in connection with the instruction execution system, apparatus, or device. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of one or more embodiments of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to illustrations and/or block diagrams of methods, apparatus (systems) and computer program products according to embodiments of the invention as shown in FIGS. 1-4 and 6-11. It will be understood that each block of the illustrations and/or block diagrams, and combinations of blocks in the illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams in the Figures illustrate the architecture, functionality, and operation of possible implementations of systems, methods and computer program products according to various embodiments of the present invention. In this regard, each block in the diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the diagram, and combinations of blocks in the block diagrams can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   one or more processors storing a plurality of different industry models in a plurality of different repositories remotely located from each other;
   the one or more processors constructing and storing a set of two or more topic maps, each of the topic maps comprising a plurality of different subjects, each subject being indexed to one of the different industry models and being indexed to a storage location of one of the different industry models;
   the one or more processors converting the two or more topic maps into a semantic language representation that is stored in a semantic web repository;
   the one or more processors receiving search criteria defining software requirements for a user directed search for a subset of the different industry models;
   the one or more processors using the received search criteria to select at least one of the topic maps matching the received search criteria;
   the one or more processors providing the selected at least one topic map, wherein the provided at least one topic map is to be displayed within a graphical user interface to a user from which the search criteria was received; and
   the one or more processors determining a role of the user;
   based on the role, the one or more processors filtering the at least one topic map; and
   the one or more processors merging filtered ones of the at least one topic map into the provided at least one topic map.

2. The method of claim 1, further comprising:
   the one or more processors receiving a user selection from the provided at least one topic map;
   the one or more processors determining a corresponding subset of the different industry models for the received user selection; and
   the one or more processors providing the determined corresponding subset of the different industry models, wherein the determined corresponding subset of the different industry models comprises a set of assets satisfying at least a portion of the defined software requirements.

3. The method of claim 2, said different repositories comprising one or more asset repositories, one or more document management repositories, and one or more Web site content repositories.

4. The method of claim 2, wherein said different industry models comprise different types of industry models, each of the different types of industry models being created and maintained in using tooling specific to a corresponding one of the different types of industry models.

5. The method of claim 2, wherein said plurality of different repositories together form a service oriented architecture industry model repository.

6. The method of claim 2, wherein each of the two or more topic maps are built by different domain experts and organized in different conceptual spaces according to meaning.

7. The method of claim 2, wherein the provided at least one topic map, when displayed within the graphical user interface, shows occurrences of model assets satisfying the software requirements.

8. The method of claim 1, further comprising:
   the one or more processors versioning the constructed and stored topic maps.

9. A computer program product comprising:
   one or more non-transitory computer readable storage media, and program instructions, stored on at least one of the one or more non-transitory computer readable storage media, the program instructions comprising:
   program instructions to store a plurality of different industry models in a plurality of different repositories remotely located from each other;
   program instructions to construct and store a set of two or more topic maps, each of the topic maps comprising a plurality of different subjects, each subject being indexed to one of the different industry models and being indexed to a storage location of one of the different industry models;
   program instructions to receive search criteria defining software requirements for a user directed search for a subset of the different industry models;
   program instructions to use the received search criteria to select at least two of the topic maps matching the received search criteria;
   program instructions to convert the two or more topic maps into a semantic language representation that is stored in a semantic web repository;
   program instructions to provide the selected at least one topic map, wherein the provided at least one topic map is displayed within a graphical user interface to a user from which the search criteria was received;
   program instructions to determine a role of the user;
   program instructions to, based on the role, the one or more processors filter the at least one topic map; and
   program instructions to merge filtered ones of the at least one topic map into the provided at least one topic map.

10. The computer program product of claim 9, said different repositories comprising one or more asset repositories, one or more document management repositories, and one or more Web site content repositories.

11. The computer program product of claim 9, wherein said different industry models comprise different types of industry models, each of the different types of industry models being created and maintained in using tooling specific to a corresponding one of the different types of industry models.

12. The computer program product of claim 9, wherein said plurality of different repositories together form a service oriented architecture industry model repository.

13. The computer program product of claim 9, wherein each of the two or more topic maps are built by different domain experts and organized in different conceptual spaces according to meaning.

14. The computer program product of claim 9, wherein the provided at least one topic map, when displayed within the graphical user interface, shows occurrences of model assets satisfying the software requirements.

15. A computer system comprising:
one or more processors, one or more computer-readable memories, one or more non-transitory computer readable storage media, and program instructions, stored on at least one of the one or more non-transitory computer readable storage media for execution by at least one of the one or more processors via at least one of the one or more memories, the program instructions comprising:
program instructions to store a plurality of different industry models in a plurality of different repositories remotely located from each other;
program instructions to construct and store a set of two or more topic maps, each of the topic maps comprising a plurality of different subjects, each subject being indexed to one of the different industry models and being indexed to a storage location of one of the different industry models;
program instructions to convert the two or more topic maps into a semantic language representation that is stored in a semantic web repository;
program instructions to receive search criteria defining software requirements for a user directed search for a subset of the different industry models;
program instructions to use the received search criteria to select at least one of the topic maps matching the received search criteria;
program instructions to provide the selected at least one topic map, wherein the provided at least one topic map is displayed within a graphical user interface to a user from which the search criteria was received;
program instructions to determine a role of the user;
program instructions to, based on the role, the one or more processors filter the at least one topic map; and
program instructions to merge filtered ones of the at least one topic map into the provided at least one topic map.

* * * * *